(12) United States Patent
Fineout et al.

(10) Patent No.: US 8,200,573 B2
(45) Date of Patent: Jun. 12, 2012

(54) MULTI-VARIABLE TRANSACTION SYSTEM AND METHOD

(75) Inventors: A. John Fineout, Coppell, TX (US);
Craig M. Allen, Keller, TX (US);
Thomas R. Brower, Dallas, TX (US)

(73) Assignee: Skopos Financial Group, LLC, New York, NY (US)

( * ) Notice: Subject to any disclaimer, the term of this patent is extended or adjusted under 35 U.S.C. 154(b) by 395 days.

(21) Appl. No.: 12/133,842

(22) Filed: Jun. 5, 2008

(65) Prior Publication Data

US 2009/0307128 A1 Dec. 10, 2009

(51) Int. Cl.
*G06Q 40/00* (2012.01)
(52) U.S. Cl. ............ 705/38; 705/1; 705/7; 705/28; 705/31; 705/35; 705/36 R; 705/37; 705/39; 705/40; 705/400; 710/12; 712/233
(58) Field of Classification Search .......... 705/1, 7, 705/28, 31, 35, 36 R, 37, 38, 39, 40, 400; 710/12; 712/233
See application file for complete search history.

(56) References Cited

U.S. PATENT DOCUMENTS

| | | | |
|---|---|---|---|
| 7,657,470 B1* | 2/2010 | Delurgio et al. | 705/35 |
| 2002/0040339 A1* | 4/2002 | Dhar et al. | 705/38 |
| 2002/0099655 A1* | 7/2002 | Melchior et al. | 705/40 |
| 2003/0018558 A1* | 1/2003 | Heffner et al. | 705/37 |
| 2003/0041019 A1* | 2/2003 | Vagim et al. | 705/38 |
| 2003/0050884 A1* | 3/2003 | Barnett | 705/35 |
| 2004/0059658 A1* | 3/2004 | Sosville | 705/35 |
| 2004/0186927 A1* | 9/2004 | Eryurek et al. | 710/12 |
| 2005/0251466 A1* | 11/2005 | Mattsson | 705/35 |
| 2005/0261995 A1* | 11/2005 | Phelan | 705/31 |
| 2006/0069585 A1* | 3/2006 | Springfield et al. | 705/1 |
| 2006/0080265 A1* | 4/2006 | Hinds et al. | 705/400 |
| 2006/0095367 A1* | 5/2006 | Iverson | 705/39 |
| 2006/0155639 A1* | 7/2006 | Lynch et al. | 705/38 |
| 2006/0167792 A1* | 7/2006 | Hahn-Carlson | 705/40 |
| 2007/0073613 A1* | 3/2007 | Lee | 705/38 |
| 2007/0136162 A1* | 6/2007 | Thibodeau et al. | 705/35 |
| 2007/0288397 A1* | 12/2007 | Frahm et al. | 705/36 R |
| 2008/0015954 A1* | 1/2008 | Huber et al. | 705/28 |
| 2008/0071676 A1* | 3/2008 | Vagim et al. | 705/38 |
| 2008/0243569 A1* | 10/2008 | Hadden | 705/7 |
| 2008/0300932 A1* | 12/2008 | Dawson et al. | 705/7 |
| 2008/0301419 A1* | 12/2008 | Barros et al. | 712/233 |

* cited by examiner

*Primary Examiner* — James P Trammell
*Assistant Examiner* — Sanjeev Malhotra
(74) *Attorney, Agent, or Firm* — Jackson Walker L.L.P.; Christopher J. Rourk

(57) ABSTRACT

A system for optimization of variables is provided. The system includes a buyer finance system for receiving asset data and buyer finance data. A seller variable system receives the asset data and the buyer finance data and applies a seller variable distribution to generate seller transaction state data. A finance variable system receives the asset data and the buyer finance data and applies a finance variable distribution to generate finance transaction state data. A variable optimization system receives the seller transaction state data and the finance transaction state data and generates transaction approval data.

14 Claims, 3 Drawing Sheets

US 8,200,573 B2

MULTI-VARIABLE TRANSACTION SYSTEM AND METHOD

FIELD OF THE INVENTION

The present invention pertains to the field of transaction processing, and more particularly to a multi-variable transaction system and method that determines whether a proposed transaction meets predetermined criteria and which determines an optimal modified transaction if the predetermined criteria are not met.

BACKGROUND OF THE INVENTION

Systems and methods for processing transactions are known in the art. Such system and methods allow buyers and sellers to interact, but offer little additional functionality. For example, if a buyer needs to obtain financing in order to proceed with the transaction, the buyer must typically independently obtain that financing, or must rely on financing 0obtained by the seller.

SUMMARY OF THE INVENTION

In accordance with the present invention, a multi-variable transaction system and method are provided that overcome known problems with transactions involving multiple parties.

In accordance with an exemplary embodiment of the present invention, a system for optimization of variables is provided. The system includes a buyer finance system for receiving asset data and buyer finance data. A seller variable system receives the asset data and the buyer finance data and applies a seller variable distribution to generate seller transaction state data. A finance variable system receives the asset data and the buyer finance data and applies a finance variable distribution to generate finance transaction state data. A variable optimization system receives the seller transaction state data and the finance transaction state data and generates transaction approval data.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
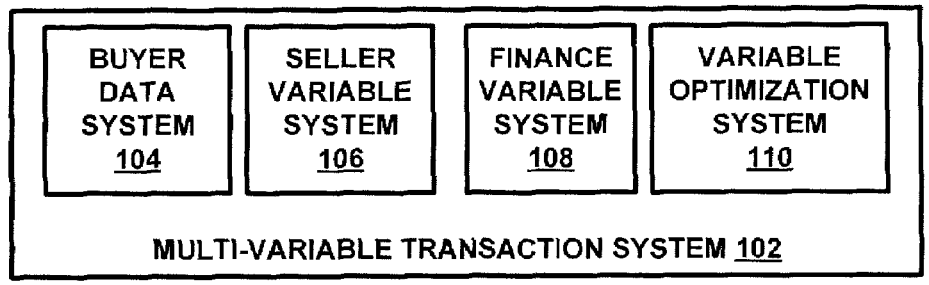
FIG. 1 is a diagram of a system for processing a transaction having multiple conflicting variables in accordance with an exemplary embodiment of the present invention.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for processing a transaction having multiple conflicting variables in accordance with an exemplary embodiment of the present invention. System 100 allows an optimal variable setting for a transaction to be determined so as to satisfy a number of potentially conflicting variable settings.

System 100 includes multi-variable transaction system 102 and buyer data system 104, seller variable system 106, finance variable system 108 and variable optimization system 110, each of which can be implemented in hardware, software, or a suitable combination of hardware and software, and which can be one or more software systems operating on a general purpose processing platform. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Buyer data system 104 receives buyer input data for a transaction. In one exemplary embodiment, buyer data system 104 can receive asset identification data, a plurality of asset classification ratings, buyer financial data such as income amounts, or other suitable input data for a transaction.

Seller variable system 106 receives seller transaction variable data. In one exemplary embodiment, seller variable system 106 can receive seller profit variable data that identifies a profit distribution, such as a minimum profit, a target profit and a maximum profit for a transaction. In this exemplary embodiment, the seller profit variable data can further identify an acceptable bound, such as between the minimum profit value and the target profit value, and an approved bound, such as between the target profit value and the maximum target value. In this exemplary embodiment, the seller profit variable data can include an acceptable loss bound, such as where the seller will accept a loss on a sale in order to dispose of assets that have been for sale for a period of time in excess of a predetermined period of time. In this regard, the seller profit variable data includes a time component. Likewise, the seller profit variable data can also include an unacceptable profit bound, such as where a seller profit that is greater than a predetermined amount will not be permitted, such as to prevent a seller from seeking profits in excess of an amount that would be considered commercially reasonable. Seller variable system 106 can also provide available asset data, such as assets that the seller is offering for sale, assets that the seller would be willing to sell for another seller in order to receive a commission, and other suitable data.

Finance variable system 108 receives lender transaction variable data. In one exemplary embodiment, finance variable system 108 can receive payment to income variable data that identifies a payment distribution, such as a minimum payment to income value, a target payment to income value and a maximum payment to income value for a transaction. In this exemplary embodiment, the payment to income data can further identify an acceptable bound, such as between the minimum payment to income value and the target payment to income value, and an approved bound, such as between the target payment to income value and the maximum payment to income value. In this exemplary embodiment, an upper bound for an unacceptable payment to income amount can be identified, such as where the payment to income exceeds an allowable payment to income value, but no lower bound needs to be identified, such as where a small payment relative to a large income value would be acceptable. Finance variable system 108 can also receive other suitable transaction variable data.

Variable optimization system 110 is coupled to buyer data system 104, seller variable system 106 and finance variable system 108. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), or other suitable connections.

Variable optimization system 110 determines whether the transaction data from buyer data system 104 is compatible with variable data of seller variable system 106 and finance variable system 108. If it is determined that the transaction data is not compatible, variable optimization system 110 performs optimization of the data to determine whether the buyer transaction data can be changed to be compatible with the variable data. In this exemplary embodiment, if the buyer transaction data results in variable data of seller variable system 106 or finance variable system 108 that is unacceptable, variable optimization system 110 can determine whether the buyer transaction data can be optimized, such as by increasing a down payment amount, increasing a finance term to decrease a payment to income amount, decreasing a seller profit, substituting the transaction asset for a different asset that is acceptable to the buyer, or otherwise modifying the buyer transaction data to result in an acceptable transaction.

In operation, system 100 allows three different parties to identify data and variable constraints for a transaction and determines and optimal setting for such data and variables based upon predetermined values. System 100 allows buyers to submit transaction data that is analyzed relative to seller variables and finance variables, and can generate an indication that the proposed transaction is acceptable, can determine an optimal modified transaction if the proposed transaction is not acceptable, or can perform other suitable functions. System 100 thus allows different parties to not only analyze a transaction so as to make the transaction acceptable to all parties but also to consider different assets or transaction parameters that can be selected to go forward with a transaction that is acceptable to all parties.

Figure 2:
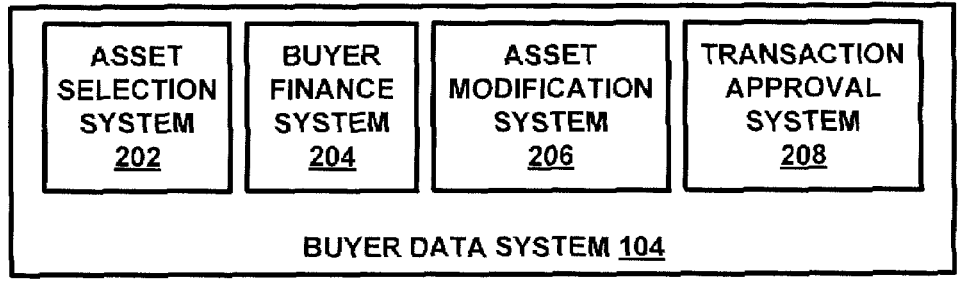
FIG. 2 is a diagram of system for receiving buyer transaction data according to an exemplary embodiment of the present invention.

FIG. 2 is a diagram of system 200 for receiving buyer transaction data according to an exemplary embodiment of the present invention. System 200 includes buyer data system 104 and asset selection system 202, buyer finance system 204, asset modification system 206 and transaction approval system 208, each of which can be implemented in hardware, software or a suitable combination of hardware and software, and which could be one or more software systems operating on a general purpose processing platform.

Asset selection system 202 allows a buyer to select an asset for a purchase. In one exemplary embodiment, asset selection system 202 can allow a buyer to identify assets based on predetermined asset criteria, such as automobiles, boats, aircraft, homes or other assets. In this exemplary embodiment, asset selection system 202 can allow a buyer to identify a make, model, year, and other vehicle variables, and to see available vehicles of interest to the buyer. Likewise, other suitable assets can be displayed and selected using asset selection system 202.

Buyer finance system 204 allows the buyer to enter buyer finance data that may be of interest to a seller or finance provider. In one exemplary embodiment, buyer finance system 204 can allow a buyer to enter buyer identifying information, income information, asset information, or other suitable date. Buyer finance system 204 can also interface with credit reporting agencies or other suitable databases to provide additional information regarding the buyer.

Asset modification system 206 receives asset data from asset selection system 202 and identifies related assets that can be selected in lieu of assets selected through asset selection system 202. In one exemplary embodiment, asset modification system 206 can allow a seller to indicate whether or not assets from other sellers should be included, such as where the seller will receive a seller's fee or commission for the sale instead of losing a sale when the seller does not have any assets of interest to the buyer. Likewise, asset modification system 206 can include a plurality of user-entered preferences and can map those preferences to features of assets. In one exemplary embodiment, the features can be further defined as a plurality of feature dimensions and plurality of psychological dimensions. In this exemplary embodiment, feature dimensions can include the concrete features of an asset. For example, if the asset is an automobile, the feature dimensions can include the number of doors, the vehicle class (sedan, pickup), the engine size, and other suitable features. The psychological dimensions can include predetermined psychological factors such as whether the car is classified as a luxury or standard model, whether the car is perceived as an import or domestic model, or other suitable psychological dimensions. Asset modification system 206 can also receive information from asset selection system 202 that identifies features of particular interest to a buyer, such as the location of the asset, the condition of the asset, the age of the asset, or other suitable buyer-specific features. Asset modification system 206 can determine potential substitute assets for a selected asset based upon the feature dimensions and user preferences.

Transaction approval system 208 submits a requested transaction from a buyer to seller variable system 106 and finance variable system 108, and a modified transaction to a buyer. In one exemplary embodiment, transaction approval system 208 can notify the buyer that the requested transaction has been approved after receipt of approval data from the seller and finance provider. Likewise, transaction approval system 208 can request approval from a buyer of a modified transaction, such as one having different terms that are specified based on seller variable data or finance variable data, one having different underlying assets, or other suitable modified transactions.

In operation, system 200 allows the buyer to enter transaction data and identify assets for which a transaction is requested, and performs additional functions to allow a seller to identify alternative assets, a seller or finance provider to offer alternate transaction terms, and to approve the transaction or alternative transactions that may be acceptable to a buyer.

Figure 3:
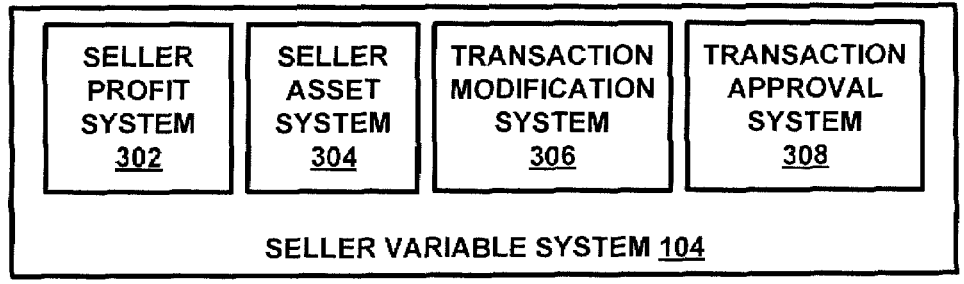
FIG. 3 is a diagram of a system for providing seller variable data in accordance with an exemplary embodiment for the present invention.

FIG. 3 is a diagram of a system 300 for providing seller variable data in accordance with an exemplary embodiment for the present invention. System 300 includes seller variable system 106 and seller profit system 302, seller asset system 304, transaction modification system 306, and transaction approval system 308, each of which can be implemented in hardware, software or a suitable combination of hardware and software, and which could be one or more software systems operating on a general purpose processing platform.

Seller profit system 302 allows a seller to identify profit information. In one exemplary embodiment, seller profit system 302 can allow a seller to identify a minimal acceptable profit, a target profit, an amount of profit the seller must make in order to sell another party's assets, whether the seller is willing to sell an asset at a loss, or the suitable data. Likewise, a maximum profit value can also or alternatively be assigned. In this manner, a first bound for profits that are acceptable can be identified, and a second bound for profits that are preferred can be identified, so as to allow a proposed transaction to be dynamically modified in order to approve a transaction that might otherwise be declined.

Seller asset system 304 allows the seller to enter assets and associated data to be used in selecting assets for sale. In one exemplary embodiment, seller asset system 304 allows seller to identify a plurality of vehicles or other suitable assets and identifying feature data for such assets, the length of time such assets have been offered for sale by the buyer, such as where the seller will sell assets that have been marketed at the seller's facility for a long period of time at a lower profit or even a loss, or other suitable data.

Transaction modification system 306 allows a seller to modify transaction data or to receive a query to approve modification of a transaction. In one exemplary embodiment, a seller can be asked to modify a transaction by identifying a lower price, a lower profit, or the suitable information.

Transaction approval system 308 allows the seller to submit a transaction for approval, such as to a financing system or a buyer, and to approve any modified changes to the transaction. In one exemplary embodiment, a seller can select on or more finance organizations for analysis of a proposed financing transaction, can receive data identifying a finance organization from a buyer, such as where the buyer has been pre-approved, or other suitable data.

In operation, system 300 allows a seller to identify and modify variables and to list assets so that buyers can identify the assets, make an offer, and confirm a transaction.

Figure 4:
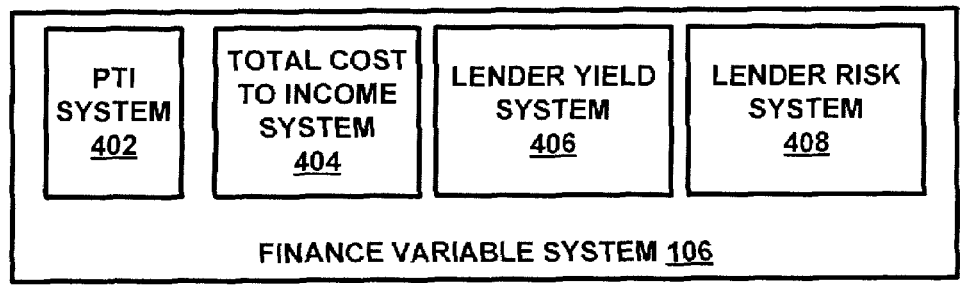
FIG. 4 is a diagram of a system for providing financing variables in accordance with an exemplary embodiment of the present invention.

FIG. 4 is a diagram of a system 400 for providing financing variables in accordance with an exemplary embodiment of the present invention. System 400 includes finance variable system 108 and PTI system 402, total cost to income system 404, lender yield system 406, and lender risk system 408, each of which can be implemented in hardware, software, or a suitable combination of hardware and software, and which can be one or more software systems operating on a general purpose processing platform.

PTI system 402 allows a finance provider to identify a payment to income distribution of interest to the finance provider. In one exemplary embodiment, the finance provider can identify payment to income distributions with a target payment to income amount, an upper range (in one exemplary embodiment, the upper range can be a value that is smaller than the payment to income target) and a lower range (in one exemplary embodiment, the target for the lower range can be an amount that is higher than the target payment to income amount) and other suitable data. In this manner, a distribution of acceptable and preferred payment to income ranges can be generated, so as to allow a transaction to be optimized where other transaction variables fall outside of acceptable values. Likewise, where the upper range for a proposed transaction is exceeded (indicating a payment to income amount that is relatively small), the buyer can be notified that they qualify for a more expensive asset, so as to allow a buyer to consider more expensive assets for purchase.

Total cost to income system 404 can receive asset data and can identify total cost to income for the asset. In one exemplary embodiment, the asset data can be associated with expected repair costs, insurance costs, fuel costs, or other suitable data such that the total cost to income that is expected from ownership of the asset can be determined. Likewise, total cost to income system 404 can receive distribution data to allow a finance provider to identify minimum, target and high distribution parameters, so as to allow a transaction to be modified to accommodate transaction parameters that are outside of acceptable values, to notify the buyer that more expensive assets can be purchased, to notify the buyer that the cost of the proposed asset and the costs associated with ownership and operation of the proposed asset are unacceptable based on the buyer's income, or to provide other suitable data.

Lender yield system 406 allows a lender to identify a lender yield distribution of low, target, and high lender yield statistics. In one exemplary embodiment, a lender can decide on a minimum acceptable yield, a target yield, and a high bound yield so that the lender can determine whether to modify yield parameters based on other transaction parameters such as employment history, credit rating or other suitable data. Where the lender yield would result in an amount that is lower than acceptable to the lender or greater than allowed, the yield amount can be modified to result in an acceptable yield, such as by increasing or decreasing the payment amount, increasing or decreasing the amount being financed, or by modifying other suitable parameters.

Lender risk system 408 allows a lender to identify transaction risk parameters and risk distribution data. In one exemplary embodiment, a risk associated with a buyer can be quantified based on credit rating, employment history, or a suitable number of factors. Likewise, distributions can be generated or provided for such risk parameters that can be used to determine whether other variables can be modified so as to provide an acceptable alternative. In another exemplary embodiment, the risk that a borrower will default over time can be determined based on empirical data associated with similar borrowers, similar assets or other criteria, and the lender's risk as a function of time can be determined, so as to allow a lender to determine whether the cost of re-acquisition of the asset and depreciation of the assert may result in a loss to the lender. In this exemplary embodiment, the value of the asset as it depreciates over time can be correlated to the weighted risk of default, in order to allow a lender to determine whether there are any periods during which the lender is exposed to a risk of loss.

In operation, system 400 allows a lender to specify criteria that can be used to optimize a multi-variable transaction. System 400 thus allows lenders to be presented with deals that meet predetermined criteria without requiring a lender to specifically consider each deal, rely on human factors to modify deals to determine an acceptable or optimal deal, or to otherwise process deals in a manner that can result in improper approval of deals.

Figure 5:
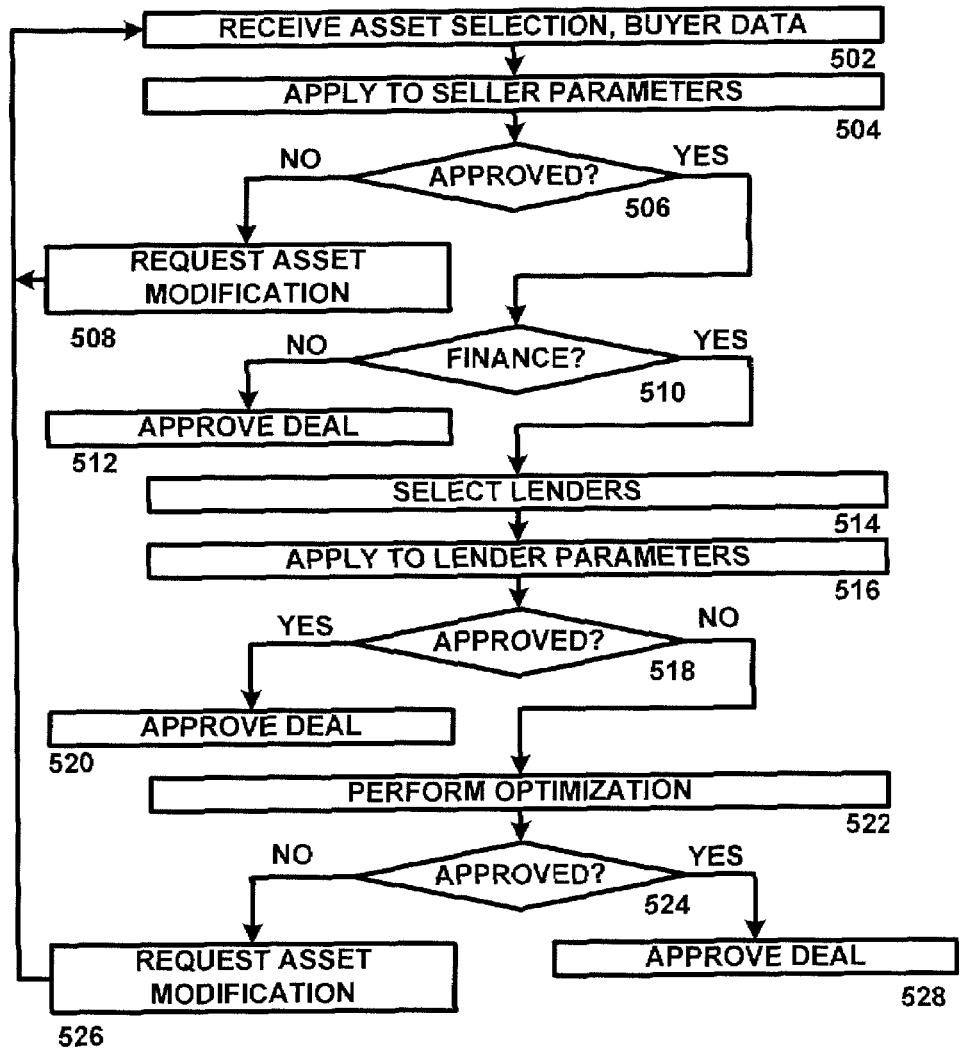
FIG. 5 is a flow chart of a method in accordance with an exemplary embodiment of the present invention.

FIG. 5 is a flow chart of a method 500 in accordance with an exemplary embodiment of the present invention. Method 500 allows a buyer to provide data to a seller to provide alternatives and allows a finance provider to provide financing based on multiple variables that affect each of the three parties.

Method 500 begins at 502 where asset selection and buyer data is received. In one exemplary embodiment, the asset data can be selected from a list of available assets, a buyer can identify assets of interests and can receive a list of available assets, or other suitable data can be provided. The buyer data can include data manually entered by a buyer, data received from data sources that identify the buyer's characteristics and credit history, data that quantifies the stability of the buyer's employer, or other suitable information. The method then proceeds to 504.

At 504 the asset selection and buyer data is applied to seller parameters. In one exemplary embodiment, the buyer can identify an asset and provide buyer data, and those criteria can be applied to seller criteria to determine whether or not the buyer is approved to purchase the asset. In this exemplary embodiment, the buyer may offer to pay cash, the seller may elect to finance a purchase, or other suitable processes can be used. The method then proceeds to 506.

At 506, it is determined whether the buyer has been approved by the seller. If the buyer has not been approved, the method proceeds to 508 where asset modification is requested. The method then returns to 502. Otherwise the method proceeds to 510.

At 510, it is determined whether financing is desired by the buyer or seller. In one exemplary embodiment, a seller can determine whether to offer the asset to a finance services provider, to underwrite the purchase on the seller's own credit facilities, or to accept the purchase based on a total cash purchase. Likewise, the buyer can utilize a pre-approved financing provider or other suitable processes. If it is determined that financing is not required, the method proceeds to 512 and the deal is approved. Otherwise the method proceeds to 514.

At 514, one or more lenders are selected for consideration. In one exemplary embodiment, the lenders can be external lenders or other suitable lenders can be provided. If external lenders are provided, the seller can interface directly with those lenders. Otherwise the method proceeds to 516.

At 516, the seller parameters and buyer data are applied to the lender parameters. In one exemplary embodiment, the seller parameters, buyer data and lender parameters can be processed to determine whether optimization of the deal is required. The method then proceeds to 518.

At 518 it is determined whether the deal is approved as presented. If the deal is approved as presented the method proceeds to 520 and the deal is approved and the parties are notified. Otherwise the method proceeds to 522.

At 522 the deal parameters are optimized. In one exemplary embodiment, a distribution for each of the parameters can be defined that includes a target value, a low bound value and a high bound value, and the parameters can be varied to determine the effect of the variable parameters on other variables. In this exemplary embodiment, the optimization can include applying input data to variable distributions that include a target amount, a low bound and a high bound to determine whether the input data results in variable outputs that are acceptable. Variable outputs between the low bound and target amount can be acceptable but not preferred, variable outputs between the target amount and the high bound can be preferred, variable outputs above the high bound can be reduced (such as by modifying acceptable or preferred variable outputs) in order to optimize the deal so as to prevent one party from realizing predetermined allowable results, and variable outputs below the low bound can be increased to create an acceptable transaction, such as in the manner previously described for transaction inputs and transaction variable distributions. The method then proceeds to 524.

At 524, it is determined whether the optimization has resulted in an approved set of parameters. If it is determined that the set of parameters is still unacceptable the method proceeds to 526 where asset modification is requested. In one exemplary embodiment, the asset modification can include a selection of a different underlying asset by the buyer. Likewise, the seller can be requested to approve alternate terms of a deal, such as where the seller loses money in order to sell an asset that has been in inventory for a period of time that exceeds a predetermined allowable period of time, to bundle the asset with other services, or to otherwise modify the terms of the deal. Likewise, the finance provider can be provided with alternatives, such as to accept different yield, payment to income or total cost to income values, other finance providers can be contacted, or other similar modifications can be requested. The method then returns to 502. Likewise, if it determined that at 524 the deal is approved, the method proceeds to 528 and the parties are notified of the deal terms.

In operation, method 500 allows multiple parties to provide variables and input data for a deal and optimizes the deal in the event that the initial parameters are not acceptable to one or more parties. Method 500 allows dynamic modification of deal input data and variables to be performed to provide consistent analysis of proposed deals so as to prevent transactions from being approved that do not meet predetermined transaction parameters.

Figure 6:
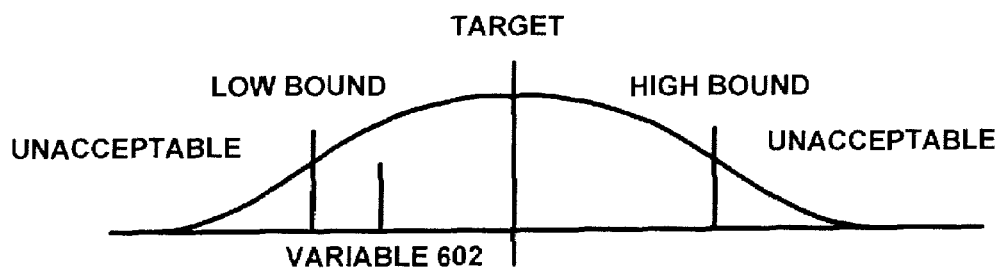
FIG. 6 is a diagram of a variable with acceptable and target amounts in accordance with an exemplary embodiment of the present invention.

FIG. 6 is a diagram of a variable with acceptable and target amounts in accordance with an exemplary embodiment of the present invention. Distribution 600 includes a target value, a low bound, and a high bound each of which can be determined by a user, based on predetermined default values, or otherwise selected. Variable 602 of distribution 600 represents a variable amount based on buyer input data, asset data, transaction data or other suitable data. In one exemplary embodiment, the value of variable 602 can be modified recursively or in other suitable manners so as to determine the effect of a change in variable 602 on other variables. In this exemplary embodiment, where one variable 602 for one distribution falls below the low bound, the effect of moving that variable up to the low bound on other variables can be determined. For example, if a first variable 602 represents a dealer profit amount for a dealer profit distribution, decreasing the dealer profit to a low bound can be performed in order to result in a corresponding decrease of a second variable 602 in a payment to income distribution, where the value of the second variable exceeds the high bound and the decrease in dealer profit is used to apply a down payment to a financed amount so as to decrease the monthly payment amount and corresponding payment to income value. Likewise, other suitable optimization processes can be performed, such as where all of the proposed variable values fall in acceptable or preferred ranges and modification of the variables to move them closer to target values is performed.

Figure 7:
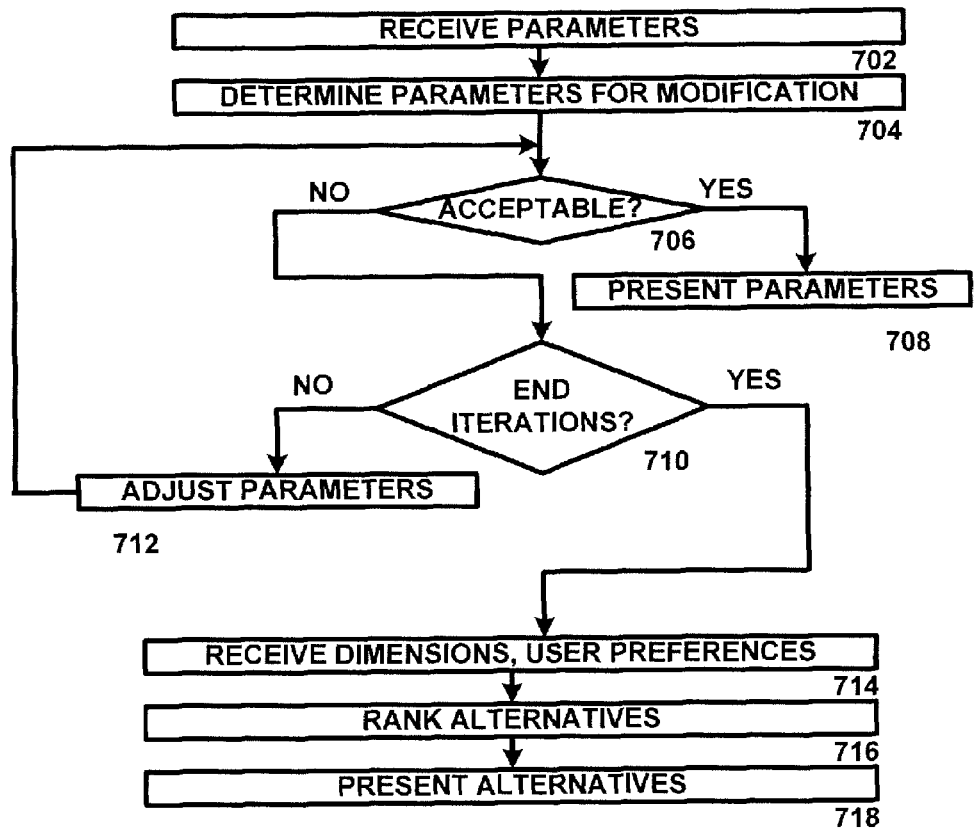
FIG. 7 is a flow chart of a method for optimizing transaction variables in accordance with an exemplary embodiment of the present invention.

FIG. 7 is a flow chart of a method 700 for optimizing transaction variables in accordance with an exemplary embodiment of the present invention. Method 700 begins at 702 where transaction parameters are received. In one exemplary embodiment, the transaction parameters can include buyer input data, one or more asset selections, seller variables, lender variables and other suitable data. The method then proceeds to 704.

At 704, it is determined which parameters should be tested for modification. In one exemplary embodiment, parameters that are more strongly related to other parameters that are unacceptable can be determined, such as by empirical analysis, mathematical analysis, or in other suitable manners, and those parameters can be varied so as to cause the unacceptable parameter values to be modified. For example, it may be determined that automobile buyers that are interested in engine size are less interested in whether an alternative automobile is perceived as being domestic or foreign, and are more interested in whether the alternative automobile has a manual or automatic transmission. Likewise, analytical processes can be used to determine which parameters or groups of parameters have the strongest effect on the unacceptable parameters, all parameters can be varied to determine which parameters provide the best response, or other suitable processes can be used.

In one exemplary embodiment, method 700 can be used in conjunction with automobile assets, such that the transaction input data can include a vehicle price, buyer income data, buyer risk data, vehicle total cost data, and other suitable data. In this exemplary embodiment, the buyer can select a vehicle, a loan term, a down payment amount and other suitable data. Based on the transaction input data, it can be determined whether the payment to income ratio or total cost to income ratio may be higher than a lender will allow, such as where the lender is not willing to advance a loan to the buyer. Likewise, the risk of default based on the expected asset recovery value can be determined, whether the buyer's credit rating or the stability of the buyer's employer places the buyer in a higher risk category can be determined, or other suitable transaction parameters can be determined and applied to the transaction data. Method 700 can be used to determine whether transaction parameters can be modified in order to provide a set of parameters that are acceptable to all parties. For example, by extending the loan term, the monthly payment for the vehicle may be lowered to result in an acceptable payment to income ratio and total cost to income ratio. Likewise, by increasing the down payment or decreasing the dealer profit, the amount being financed may be lowered to result in an acceptable payment to income ratio and total cost to income ratio. Other suitable parameters can also or alternatively be identified or varied. The method then proceeds to 706.

At 706, it is determined whether an acceptable result has been obtained. In one exemplary embodiment, an acceptable result can be identified where all parameters have either an acceptable or preferred value. If it is determined that an acceptable result has been obtained, the method proceeds to 708 where the modified parameters are presented. Otherwise, the method proceeds to 710, where it is determined whether iterations should be terminated. If it is determined that iterations should be terminated, the method proceeds to 714. If it is determined that iterations should not be terminated, the method proceeds to 712, where the parameters are adjusted. In one exemplary embodiment, where an iterative procedure is used, it may be necessary to perform a series of calculations based on varying values of parameters. Likewise, iterative procedures can be implemented at individual method steps, such that step 710 can be omitted. Otherwise, the method then returns to 706.

At 714, dimensions and user preferences are received. In one exemplary embodiment, dimensions and the relationship between assets based on those dimensions can be identified periodically, and the dimensions that relate to a vehicle that was initially selected by a user can be used to select one or more alternative vehicles. Alternatively, the dimensions and user preferences can be used to dynamically select alternative assets. For example, a user can select one or more user preferences that are greatest interest to the user, such as the number of doors of a vehicle, the year the vehicle was manufactured, or other suitable user preferences. Likewise, psychological dimensions of interest can also be selected by the user, such whether the vehicle is perceived as a standard or luxury vehicle, whether the vehicle is a domestic or import vehicle, or other suitable dimensions. The method then proceeds to 716.

At 716, one or more alternative vehicles are selected and ranked. In one exemplary embodiment, the vehicles offered for sale by the seller, by other parties, or by other suitable groups can be analyzed using the dimensions that are most closely related to the originally-selected vehicle, user selected preferences or other suitable data, and the available vehicles can be ranked based on the similarities to the originally selected vehicle, the user selected preferences, or other selection data. The method then proceeds to 718 where alternatives are presented, such as to allow a user to select an alternative if the original transaction cannot be approved.

In operation, method 700 allows parties to analyze transactions using a preferred transaction set, and further analyzes alternative transactions, including transactions involving similar transaction assets. In this manner, method 700 can be used to optimize a transaction to satisfy variables or objectives of different parties, to select alternative assets based on features of interest, and to perform other suitable functions.

Figure 8:
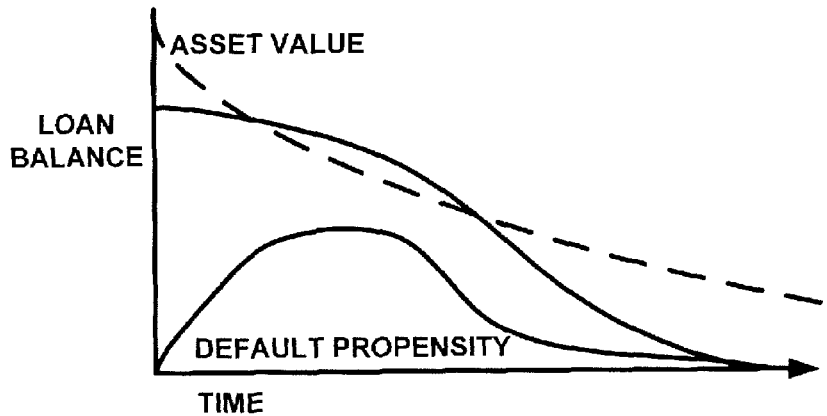
FIG. 8 is a diagram showing asset depreciation versus default risk in accordance with an exemplary embodiment of the present invention.

FIG. 8 is a diagram 800 showing asset depreciation versus default risk in accordance with an exemplary embodiment of the present invention. As shown in diagram 800, the asset value depreciates over time, such that a lender that takes the asset as collateral for a loan may incur a risk of loss based on the risk of default. There is a period of time during which the lender will incur a loss if the borrower defaults, such that the lender may elect not to accept such risks. Likewise, under other risk periods, at no time will the lender be at risk to incur a loss. The curves for default risk can be empirically determined based on populations of borrowers having similar parameters, such as annual income, years at one job, years living in one location, credit rating, the asset being purchased, or other suitable variables. Furthermore, by increasing the amount of down payment, the loan term or other suitable variables, the asset value curve can be modified so as to reduce the lenders risk.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for optimization of variables comprising:
a buyer finance system for electronically receiving asset data and buyer finance data; a seller variable system for electronically receiving the asset data and the buyer finance data and for applying a seller variable distribution using electronic data processing to generate seller transaction state data;
a finance variable system for receiving the asset data and the buyer finance data and for applying a finance variable distribution to generate finance transaction state data;
a variable optimization system for receiving the seller transaction state data and the finance transaction state data and for generating transaction approval data if predetermined conditions are met, and for generating modified transaction data if the predetermined conditions are not met, wherein the modified transaction data includes one or more alternate assets having an asset value that results in the predetermined conditions being met or exceeded;

wherein the variable optimization system is for receiving the asset data and the buyer finance data and modifying the buyer finance data based on the seller transaction state data and the finance transaction state data to generate alternate transaction data; and wherein the buyer finance system for receiving asset data and buyer finance data comprises an electronic data processing system for receiving buyer identification information, buyer income information and buyer asset information, and wherein the variable optimization system selects alternate asset information as a function of the buyer asset information if the predetermined conditions are not met.

2. The system of claim 1 wherein the seller variable system further comprises a seller profit system for receiving a seller profit distribution that includes an acceptable profit range and a preferred profit range.

3. The system of claim 1 wherein the finance variable system further comprises a payment to income system for receiving a payment to income distribution that includes an acceptable payment to income range and a preferred payment to income range.

4. The system of claim 1 wherein the finance variable system further comprises a total cost to income system for receiving a total cost to income distribution that includes an acceptable total cost to income range and a preferred total cost to income range.

5. The system of claim 1 wherein the finance variable system further comprises a lender yield system for receiving a lender yield distribution that includes an acceptable lender yield range and a preferred lender yield range.

6. The system of claim 1 wherein the finance variable system further comprises a lender risk system for receiving a lender risk distribution that includes an acceptable lender risk range and a preferred lender risk range.

7. The system of claim 1 wherein the seller variable system for receiving the asset data and the buyer finance data and for applying the seller variable distribution to generate the seller transaction state data comprises an electronic data processing system for receiving the asset data and the buyer finance data and for applying the asset data to a seller asset variable distribution and the buyer finance data to a buyer finance data variable distribution to generate seller transaction state data, wherein the seller asset variable distribution includes a high bound, a low bound and a target, wherein the buyer finance data variable distribution includes a high bound, a low bound and a target, and wherein the seller transaction state data identifies whether a seller will accept a transaction as a function of the asset data as applied to the seller asset variable distribution and the buyer finance data applied to the buyer finance data variable distribution.

8. The system of claim 1 wherein the finance variable system for receiving the asset data and the buyer finance data and for applying the finance variable distribution to generate the finance transaction state data comprises an electronic data processing system for receiving the asset data and the buyer finance data and for applying the asset data and the buyer finance data to the finance variable distribution, wherein the finance variable distribution has a high bound, a low bound and a target, and wherein the finance transaction state data identifies whether a financing organization will accept a transaction as a function of the asset data and the buyer finance data applied to the finance variable distribution.

9. The system of claim 1 wherein the variable optimization system for receiving the seller transaction state data and the finance transaction state data and for generating the transaction approval data comprises an electronic data processing system for generating seller transaction state data based on the application of the asset data and the buyer finance data to a seller variable distribution having a low bound, a high bound and a target, and for generating finance transaction state data based on the application of the asset data and the buyer finance data to a finance variable distribution having a low bound, a high bound and a target, and for generating the transaction approval data based on an optimization of the seller transaction state data and the finance transaction state data.

10. The system of claim 1, wherein the asset data comprises automobile data.

11. The system of claim 10 wherein the one or more alternate assets comprise one or more alternate automobiles having a lower cost if a first automobile cost prevents the predetermined conditions from being met.

12. The system of claim 11 wherein the one or more alternate automobiles are selected based on one or more user-entered criteria.

13. The system of claim 11 wherein the one or more alternate automobiles are selected based on one or more psychological dimensions associated with the first automobile.

14. The system of claim 11 wherein the one or more alternate automobiles are selected based on one or more available vehicles in a predetermined set.

* * * * *